Gifford & Felts,
Reciprocating Saw-Mill.

No. 67,038. Patented July 23, 1867.

Witnesses:
F. A. Jackson
W. Truwin

Inventor:
Alfred Gifford
Robt. L. Felts
Per Mimmot
Attorneys

United States Patent Office.

ALFRED GIFFORD AND ROBERT L. FELTS, OF MILROY, INDIANA.

Letters Patent No. 67,038, dated July 23, 1867.

---

IMPROVEMENT IN SAW-MILLS.

---

The Schedule referred to in these Letters Patent and making part of the same.

---

TO ALL WHOM IT MAY CONCERN:

Be it known that we, ALFRED GIFFORD and ROBERT L. FELTS, of Milroy, in the county of Rush, and State of Indiana, have invented a new and improved Saw-Mill; and we do hereby declare that the following is a full, clear, and exact description thereof, which will enable others skilled in the art to make and use the same, reference being had to the accompanying drawings, forming part of this specification, in which—

Figure 3:
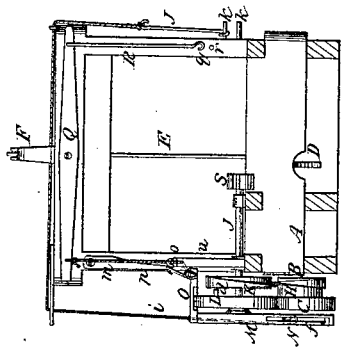
Figure 1:
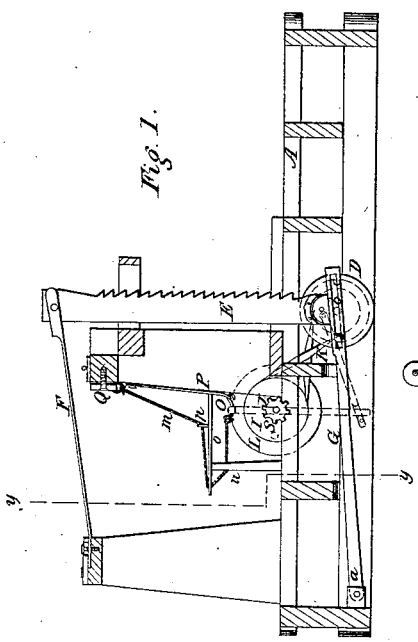
Figure 1 is a side sectional view of our invention, taken in the line $x\ x$, fig. 2.
Figure 2:
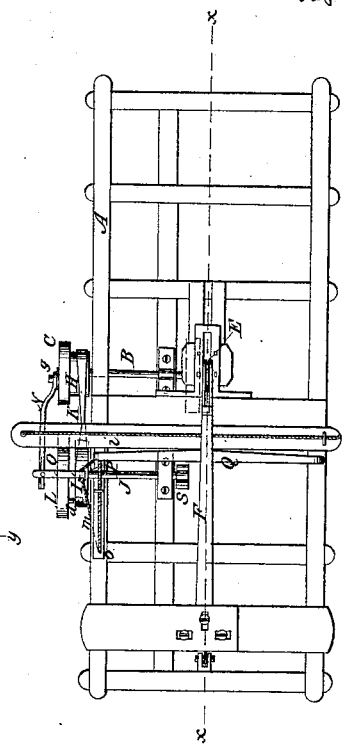
Figure 2 is a plan or top view of the same.

Figure 3, a transverse vertical section of the same, taken in the line $y\ y$, fig. 1.

Figure 4:
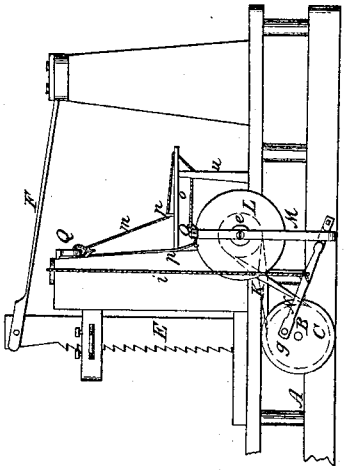

Figure 4, a side view of the same.

Figure 5:
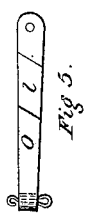

Figure 5, a detached view of a pawl pertaining to the feed mechanism of the same.

Similar letters of reference indicate like parts.

This invention relates to a new and improved reciprocating saw-mill, and has for its object portability, to admit of the whole machine being drawn from place to place by two yokes of cattle, and also to admit of being driven or run by a small engine, and to operate rapidly.

A represents the framing of the machine, which may be constructed in any proper manner to support the working parts; and B is a shaft placed in the lower part of said framing, and having a driving-pulley, C, keyed on its outer end, and a crank-pulley, D, keyed on its inner end. E is the saw, the upper end of which is attached to a spring, F, on the framing A, the lower end being secured to an arm, G, one end of which is secured in the framing by a pivot, $a$, a pin, $b$, of the pulley D working in an oblong slot, $c$, in the arm G, as shown clearly in fig. 1. The saw is kept in a proper taut state (strained) by the spring F, and the reciprocating motion is given the saw by the pin $b$ of the crank-pulley D, working in the oblong slot $c$ of the arm G, the spring F preventing jars and concussions. On the shaft B, adjoining the driving-pulley C, there is a smaller pulley, H, around which and a loose pulley, I, on a shaft, J, a cross-belt, K, passes. The shaft J is parallel with the shaft B, and the former has a pulley, L, firmly keyed on its outer end, a pin, $d$, projecting horizontally from the inner side of pulley L, to fit into a tube in the loose pulley I whenever it is desired to connect the pulley I with the shaft J. M is a lever, the fulcrum-pin $e$ of which passes into the end of shaft J. This lever has an oblong slot, $f$, made in its lower part to receive a rod, N, which is attached to the driving-pulley C by a pin, $g$, the latter passing into pulley C at some distance from its centre, in order that the rod N may be operated with a crank movement as the pulley C rotates. The rod N may be made to work higher or lower in the slot $f$, according to the length of stroke it is desired to give the lever M, by having a cord, $i$, attached to the lever, said cord passing over the framing A, and secured at different points by having a rod, $j$, which is attached to the cord $i$, fitted on different pins $k$ in the side of the framing, (see fig. 3.) O is a pawl composed of a straight bar, having a notch, $l$, made in its under side, with oblique sides, as shown clearly in fig. 5. The upper end of the lever M is fitted in one end of this pawl O, which is placed over the pulley L, the top of the latter being in the notch $l$ of the pawl. The opposite end of the pawl is connected to the lower end of a spring, P, and a cord, $m$, is also attached to the lower end of said spring, the cord $m$ passing through holes in an upright, $n$, and horizontal board $o$, and also through a guide $p$, and attached at its upper end to one end of a lever, Q, on the upper part of the framing. The opposite end of the lever Q has a rod, R, attached to it, with a hook or eye, $q$, at its lower end, to catch upon any of a series of pins, $r$, in the framing, and by adjusting this lever the spring P may be drawn outward and the pawl O rendered inoperative when desired. On the inner end of the shaft J there is a pinion, S, which gears into a rack at the under side of the log-carriage (not shown, as it is of ordinary construction.)

As the saw E is operated through the medium of the crank-pulley D and slotted arm G, the log is fed to the saw by means of the pawl O acting upon the pulley L, the pawl being vibrated by the lever M, which is actuated by the rod N from the pulley D, the length of stroke of the pawl being regulated by adjusting the rod N higher or lower in the slot $f$ of the lever M, by means of the cord $i$, and the inner end of the pawl kept in proper position by the spring P. The pawl O acts upon the pulley L each time the saw rises, so that the log will be fed to the saw during the upward stroke of the latter only; and in order to gig back the carriage, the loose pulley I is moved toward the pulley L, so that the pin $d$ of the latter may fit in the hole of the former, and the spring P, by adjusting the cord *m*, is drawn outward or forward, so as to render the pawl O inoperative, and the cross-belt K will quickly gig back the carriage.

This device has been practically tested, and it operates well, cutting from five to eight thousand feet per day, the driving-shaft running at a speed of from three to five hundred revolutions per minute.

Having thus described our invention, we claim as new, and desire to secure by Letters Patent—

1. The arrangement of the driving-pulley C, rod N, slotted lever M, pulleys I L, belt K, the shafts B J, pawl O, and spring P, to operate in the manner and for the purposes specified.

2. The adjusting of the inner end of the pawl O by means of the spring P and cord *m*, and the lever Q, or its equivalent, substantially as and for the purpose set forth.

ALFRED GIFFORD;
ROBERT L. FELTS.

Witnesses:
JAMES W. INNIS,
E. B. MANN.